United States Patent [19]

Burton

[11] 4,417,845

[45] Nov. 29, 1983

[54] PROGRAMMABLE POSITIONING AND OPERATING MECHANISM FOR INDUSTRIAL OPERATING HEAD

[75] Inventor: Charles A. Burton, Columbus, Ohio

[73] Assignee: Rimrock Corporation, Columbus, Ohio

[21] Appl. No.: 268,393

[22] Filed: May 29, 1981

[51] Int. Cl.³ .............................................. B25J 5/00
[52] U.S. Cl. .................................. 414/733; 414/718; 414/738; 414/740; 212/264
[58] Field of Search ............... 414/718, 697, 699, 700, 414/706, 709, 690, 692, 733, 735; 212/230, 231, 264, 267, 268; 187/9 E

[56] References Cited

U.S. PATENT DOCUMENTS

| Re. 28,437 | 6/1975 | Devol et al. ................... 414/733 X |
| 2,081,580 | 5/1937 | Diffenderffer ....................... 414/733 |
| 2,948,417 | 8/1960 | Haanes .................................. 414/733 |
| 3,556,329 | 1/1971 | Johnston et al. ..................... 414/663 |
| 3,790,002 | 2/1974 | Germond et al. .................... 414/735 |
| 4,283,165 | 8/1981 | Vertut ................................. 414/733 |
| 4,334,816 | 6/1982 | Slysh .............................. 414/718 X |

Primary Examiner—Joseph E. Valenza
Assistant Examiner—Terrance L. Siemens
Attorney, Agent, or Firm—Pearne, Gordon, Sessions, McCoy, Granger & Tilberry

[57] ABSTRACT

An apparatus for moving an operating head automatically through programmed functions using a telescoping arm assembly. The operating head and arm assembly are mounted on a base and are normally capable of motions about or along several axes, including linear extension and retraction relative to the base. The telescoping arm assembly includes a main carriage mounted on the base, an intermediate carriage mounted on the main carriage, and a head carriage supporting the operating head and mounted on the intermediate carriage for telescoping movement relative to the main carriage. The operating head is connected to the head carriage by a wrist joint for pivotal movement about a wrist tip axis, and even for additional rotary movement about a wrist roll axis, the control of the respective movements being accomplished for example, by chain and sprocket mechanisms in order to control the wrist movements continuously, even during the telescoping extension and retraction movement of the carriages.

18 Claims, 11 Drawing Figures

PROGRAMMABLE POSITIONING AND OPERATING MECHANISM FOR INDUSTRIAL OPERATING HEAD

BACKGROUND OF THE INVENTION

This invention relates to the automatic positioning and control of various operating instrumentalities, referred to herein and in the art as "operating heads," that are utilized to move workpieces sequentially through successive cycles wherein various industrial operations perform industrial operations, such as casting, forging, assembly, welding, and other processes are performed. More particularly, the invention relates to equipment variously referred to as "robots," "manipulators," "pick and place mechanisms," "extractors," "actuators," etc., that are controlled by program tapes and/or by similar automatic control systems, and especially to equipment in which an operating head such as a prehensile "hand," spray head, etc. is carried on an arm capable of several automatically controlled motions to achieve a wide range of travel.

Prior art equipment of the type described often utilizes an operating head, such as tongs or the like, mounted to an arm by a wrist joint that provides tipping motion about an axis perpendicular to the arm and rolling motion about an axis coextensive with the arm. The arm is generally mounted on a pedestal for swinging movement about a vertical axis, for linear extension and retraction relative to the pedestal along the arm axis, and for tilting motion relative to the pedestal about a horizontal axis. The drive for the various motions has usually been provided by various servomechanisms such as hydraulic servocylinders, servomotors, servoactuators, stepping motors, etc.

Usually, the drives for the wrist tipping and rolling motions have been located at the outer end of the arm so that a considerable load must be carried by the arm in addition to the weight of the operating head and the product or load being transported. The stress imposed at the connection between the arm and the pedestal is especially large when the arm is cantilevered out to its maximum extension. This problem requires that the weight of the arm structure be increased to provide the necessary strength.

One approach to the problem of minimizing the load on the arm has been to operate the wrist mechanism through drive tubes extending forwardly to the wrist from a drive system located at the rear of the arm. While this does reduce the weight at the wrist, the weight of the drive tubes still detracts from the load handling capability of the arm. This type of device is disclosed in U.S. Pat. Nos. 3,306,442; 3,306,471; and 3,525,382 to G. C. Devol, Jr.

One limitation inherent in prior art devices is the size of the work zone or envelope within which the operating head can function. Even with a capability of 360 degrees rotation of the arm and a range of extension-retraction of one-half the length of the arm, operation is limited to an annular zone or envelope with a radial depth equal to about one-half the arm length.

A further requirement is the need for sufficient rearward clearance for the arm when the arm is moved to its retracted position.

While the range could be expanded by pivoting a second arm (forearm) at an "elbow" joint on the main arm (upper arm), or by providing a telescoping extension of the main arm, the first system would be complex and add more weight and the second would add considerably to the problem of achieving the wrist movements.

Another problem with prior art devices is that when the operating head is supporting a desired load (workpiece, tool, etc.), and the arm is tilted about a horizontal axis relative to the pedestal, the operating head tilts also, and often places the load in an undesirable attitude. While techniques for compensating for this by performing an automatic reverse tipping of the operating head about the wrist tip axis may be utilized, such compensation using prior art techniques would be complex and extremely costly.

The invention will be shown and described in connection with its application to the die casting industry, and especially to the extraction of newly cast articles from a die casting machine and the subsequent processing of the cast articles. It will be understood that the invention has many other applications, one specific application being reciprocators for use in the die casting industry to carry a fluid emission head through successive operating cycles between the open die platens of a casting machine. The invention would have particular utility in connection with the reciprocator shown in U.S. Pat. No. 4,214,704, owned by the assignee of the present application.

In industrial die casting processes, it is common practice to use a machine to extract castings from a die casting machine. The machines are synchronized with the operation of the die casting machine and are adapted to extend an extractor arm between the opening platens of the casting machine, grasp the casting, retract the arm, and release the casting onto a conveyor belt or into a receptacle or quenching bath. Additional capabilities have been provided for such machines such that, in accordance with recent proposals, programmable industrial robots can be utilized to automatically transport the casting through a complex set of operations.

Another function often performed in die casting operations is the detection of missing parts of castings. Automatic sensing of an incomplete casting immediately after it has been moved from the die is highly advantageous. For this purpose, casting sensors can be located adjacent the die casting machine so that the absence of a section of the casting can be detected.

Performance of the operations described above by machines rather than manually is advantageous from the standpoints of both cost and safety. The safety aspect is particularly significant since the use of machines avoids the necessity for having a worker move between opposed platens of an article forming machine between operating cycles. Typical automatic devices for performing some or all of the functions described above are disclosed in the following U.S. patents:

| U.S. Pat. No. | Patentee | Issue Date |
| --- | --- | --- |
| 2,998,237 | Devol | June 13, 1961 |
| 3,251,483 | Devol | May 17, 1967 |
| 3,306,442 | Devol | February 28, 1967 |
| 3,306,471 | Devol | February 28, 1967 |
| 3,525,382 | Devol | August 25, 1970. |

Other prior art U.S. patents relating to program-controllable equipment or "robots" are as follows:

| U.S. Pat. No. | Patentee | Issue Date |
| --- | --- | --- |
| 3,007,097 | Shelley et al. | October 31, 1961 |
| 3,951,271 | Mette | April 20, 1976 |
| 4,214,704 | Nagi | July 29, 1980. |

The apparatus of the present invention resolves many of the difficulties encountered with prior art apparatus, and affords other features and advantages heretofore not obtainable.

SUMMARY OF THE INVENTION

A general object of the invention is to provide an improved operating mechanism for positioning an operating head adapted for movement relative to several axes of motion through a plurality of programmable operating cycles.

Another object is to reduce the load imposed by an operating head and wrist mechanism on an arm and pedestal assembly in an industrial positioning mechanism of the type described.

Another object is to provide a self-leveling apparatus for the operating head of an industrial positioning mechanism of the type described, wherein the apparatus permits tilting of a supporting arm for the head about a horizontal axis, and also provides compensating tipping of the head relative to the arm about a horizontal wrist axis.

A further object is to provide an apparatus for extracting castings from die casting machines that satisfies the requirements outlined above.

These and other objects and advantages are accomplished by the apparatus of the invention, which is adapted to move, through sequential functions, an operating head mounted on and extendable linearly with respect to a base or pedestal. The apparatus includes a main carriage mounted on the base, an intermediate carriage mounted on the main carriage for linear travel thereon between an extended position and a retracted position, and a head carriage mounted on the intermediate carriage for linear travel relative thereto between an extended position and a retracted position relative to the main carriage. The intermediate carriage is extended and retracted relative to the main carriage by drive means such as a hydraulic cylinder or a chain and sprocket drive mechanism, as described below. The control of the telescoping movement of the head carriage is accomplished by a first control wheel, such as a sprocket or pulley, mounted at the forward end of the intermediate carriage and a second control wheel, similar to the first, mounted at the rearward end of the intermediate carriage. A first length of flexible connecting means, such as a length of roller chain, a cable, a tape, wire, or the like, is connected at one end to the main carriage and extends forwardly around the first control wheel and then rearwardly to a connection to the head carriage. A second length of flexible connecting means similar to the first is connected at one end to the main carriage and extends rearwardly to engage and pass around the second control wheel and then forwardly to a connection to the head carriage. Accordingly, when the intermediate carriage is extended and retracted relative to the main carriage, the lengths cause simultaneous extension and retraction of the head carriage relative to the intermediate carriage.

The intermediate carriage may be driven relative to the main carriage by means of an endless, flexible connecting means and cooperating wheel means such as a chain and sprocket system or cable and pulley, etc., preferably of the same character as the control components described above. A driven wheel, such as a sprocket, is mounted on the intermediate carriage coaxially with and keyed to the second control wheel and a second idler wheel is mounted on the intermediate carriage at the forward end. A drive wheel, such as a drive sprocket, is mounted on the main carriage, and has a rotary drive therefor, such as a hydraulic actuator. The endless, flexible connecting means operatively engages the respective wheels, sprockets, or the like, and when the drive wheel is turned in one direction, the intermediate carriage and the head carriage are extended in telescoping fashion, and when turned in the opposite direction, the intermediate carriage and head carriage are retracted in telescoping fashion.

Where the operating head is connected to the head carriage by a wrist joint for pivotal movement about a wrist tip axis, and even for additional rotary movement about a wrist roll axis, the control of the respective movements is accomplished by a system using an endless, flexible connecting means (chains, roller chain, etc.) and wheel means (sprockets, etc.). Each control mechanism includes a drive sprocket and motor mounted on the main carriage, a driven sprocket for each movement located on the head carriage at the wrist joint, with its axis parallel to the drive sprocket axis, and a pair of idler sprockets mounted at the rearward end of the intermediate carriage with their axes perpendicular to the axes of the drive and driven wheels. The endless, flexible connecting means engages and operatively connects all of the respective wheels to control the wrist movements continuously even during telescoping extension and retraction movement of the carriages.

DESCRIPTION OF THE PREFERRED EMBODIMENT

Figure 1:
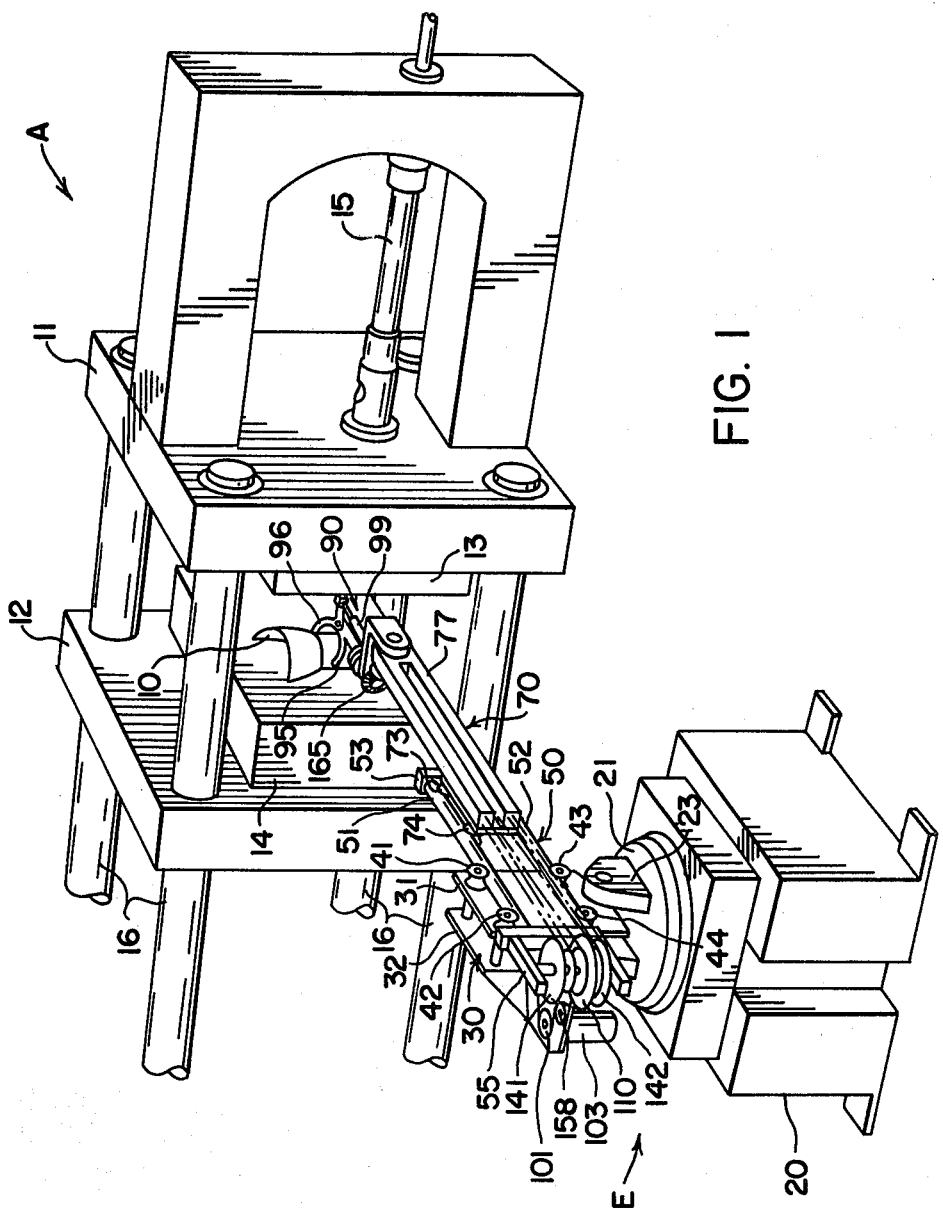
FIG. 1 is a fragmentary, schematic, perspective view of a die casting machine and of an apparatus embodying the invention for extracting and transporting castings.
Figure 2:
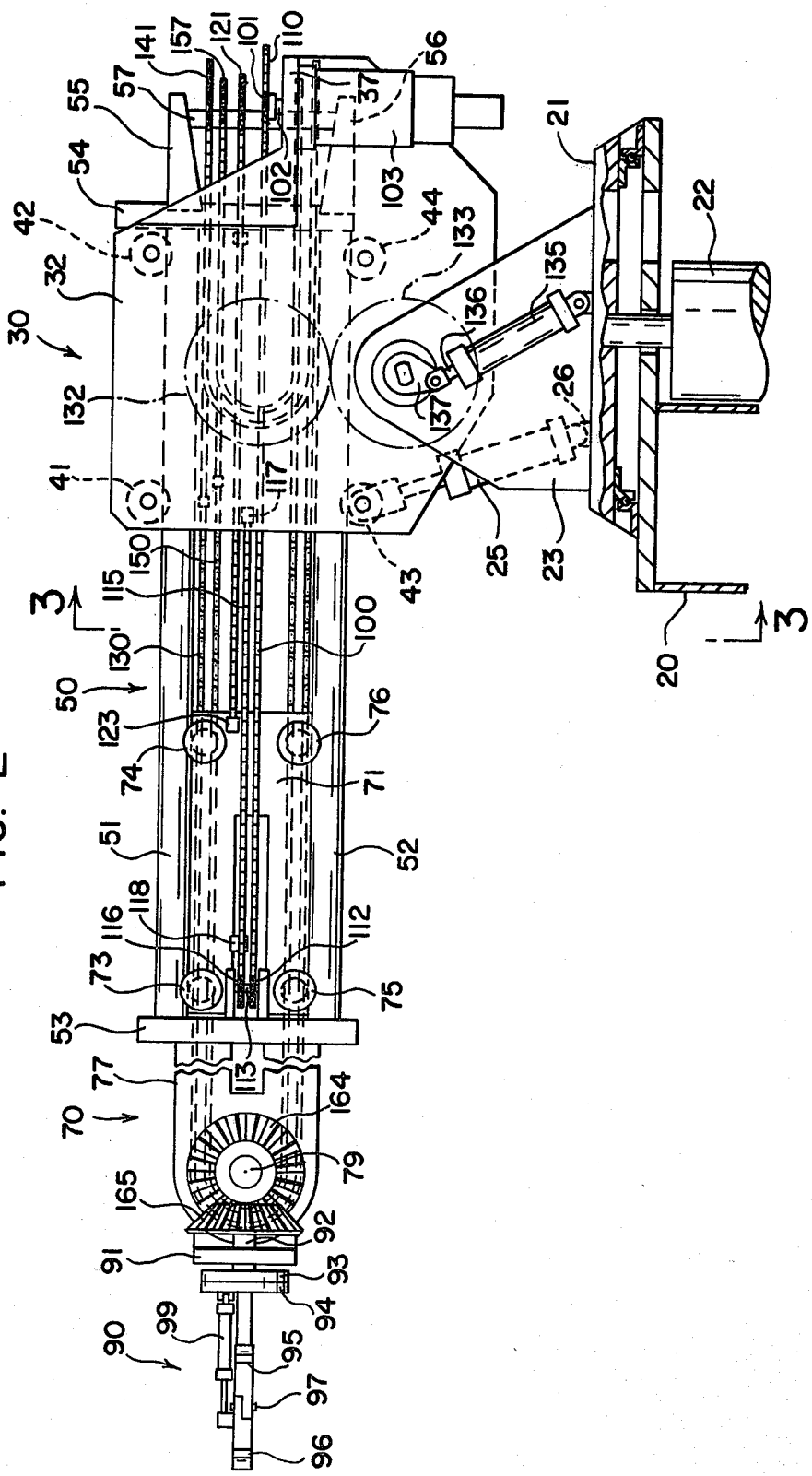
FIG. 2 is an elevational view showing the extracting and transporting apparatus of the invention, with its arm assembly broken and shown in the fully extended position and with parts broken away and shown in section.

Referring more particularly to the drawings, and initially to FIG. 1, there is shown a die casting machine A for casting pieces from molten aluminum. Associated with the casting machine are related casting processing stations, including a casting sensing station often used to sense and determine that the casting is not lacking any of its parts, a quench tank for accomplishing the normal quenching operation, a trim press for trimming excess material or flash from the casting, and a chute for conveying the casting to another location as desired.

Also there is shown in FIG. 1 an automatic extractor apparatus E embodying the invention and adapted to grasp and extract a casting 10 from the casting machine A and to transport the casting sequentially to and through the various processing stations described above.

THE DIE CASTING MACHINE

The die casting machine A is adapted to produce aluminum alloy castings 10 of many types, and generally includes a fixed die platen 11 and a movable die platen 12. The movable die platen 12 is adapted to be moved toward and away from the fixed die platen 11 in repetitive casting cycles, with the casting 10 being formed between the dies in each casting cycle. The platens 11 and 12 are shown in their open position in FIG. 1. The fixed die platen 11 supports a fixed die 13 and the movable die platen 12 carries a movable die 14.

During the casting operation, molten aluminum alloy, after being poured from a ladle, is forced into the die cavity, using the shot cylinder 15, as is common practice in the art. The movement of the movable die platen 12 between its closed and open positions is guided by tie rods 16 in accordance with standard practice. Equipment for moving the movable platen assembly is not shown, but it will be well understood by those skilled in the art.

THE EXTRACTOR

As indicated above, the extractor E embodying the invention is positioned adjacent the space between the die platens 11 and 12 when in their open positions, and at an appropriate location wherein, when moved to its retracted position, it provides sufficient clearance for opening and closing of the platens and, when the casting operation is complete and the platens are open, has sufficient range of operation to extend an operating head into the space between the platens and to grasp and extract the casting from the casting machine A and to transport the casting sequentially to and through various processing stations of the type described above. The apparatus includes a pedestal 20 resting on the floor of the operating space and having a revolving turret 21 supported thereon and turned through a desired range of travel, such as 360 degrees, by a hydraulic servomotor 22. The turret 21 has a trunnion 23 supported thereon which supports a tilting arm assembly that includes a main carriage 30, an intermediate carriage 50, a head carriage 70, and a wrist and hand assembly 90 supported at the end of the head carriage 70. The intermediate carriage 50 and head carriage 70 are mounted to telescoping extension and retraction relative to the main carriage 30 by means of a unique operating mechanism forming part of the invention. During telescoping movement, the head carraige 70 travels at twice the speed of the intermediate carriage 50.

The tilting movement of the main carriage 30 on the trunnion 23 is controlled by a hydraulic servocylinder 25 connected at one end to a bracket 26 on the turret 21 and at its other end to the forward portion of the main carriage 30.

The main carriage 30 comprises a pair of parallel mounting plates 31 and 32, each of which has a hollow axle 33 and 34, respectively, mounted at its lower end. A pair of journal bearings 35 and 36 in the arms of the trunnion support the main carriage for pivotal movement. A pair of upper rollers 41 and 42 and a pair of lower rollers 43 and 44 are mounted on the outside of the mounting plate 31.

The intermediate carriage 50 comprises a pair of hardened and ground round rails 51 and 52 secured to one another by a front block 53 and rear block 54, and adapted to engage the pairs of rollers 41, 42, 43, and 44 and be guided through extension and retraction movement relative to the main carriage by the rollers. A pair of brackets 55 and 56 extends rearwardly from the rear block 54 and support a vertical shaft 57, on which several sprockets are mounted to serve in the control of the various functions of the arm assembly, to be described below.

The head carriage 70 comprises a mounting plate 71 that supports a pair of upper rollers 73 and 74 and a pair of lower rollers 75 and 76. The rollers 73, 74, 75, and 76 are located between and in engagement with the round rails 51 and 52, and guide the head carriage along the intermediate carriage 50 for extension and retraction movements relative thereto. A beam 77 is mounted on and extends forwardly from the mounting plate and has a horizontal wrist pin 79 journaled at its forward end. The wrist pin 79 supports additional components of the wrist and hand assembly as well as sprockets used to control the various wrist movements.

The wrist and hand assembly 90 includes a wrist tilt block 91 journaled on the wrist pin 79 and having a roll shaft 92 journaled therein, with its axis extending perpendicular to the wrist tip axis defined by the wrist pin 79. At the outer end of the roll shaft 92 is a mounting flange 93 on which the hand assembly is mounted. The hand assembly comprises a head plate 94 that supports a gripper tong assembly including a tong 95 and a tong 96 pivoted about a pivot pin 97 and operated by an air cylinder 99.

The wrist construction enables the wrist and hand assembly 90 to be pivoted about the axis defined by the wrist pin 79 supported at the end of the head carriage 70 on the one hand, and on the other hand about the axis defined by the roll shaft 92 which is parallel to the direction of extension and retraction of the intermediate carriage 50 and head carriage 70.

CARRIAGE DRIVE SYSTEM

As indicated above, the intermediate carriage 50 and head carriage 70 are adapted for linear travel through extension and retraction movement in a 1:2 telescoping fashion relative to the main carriage 30. The main drive is adapted to extend and retract the intermediate carriage 50 relative to the main carriage, and that drive is transmitted to a control mechanism that utilizes the motion derived from the main drive to achieve a telescopic simultaneous extension or retraction of the head carriage relative to the intermediate carriage 50 and main carriage 30. The drive system for the intermediate carriage utilizes an endless drive chain 100 that engages a drive sprocket 101 supported on a mounting bracket 37 mounted on the mounting plate 32 on the main carriage 30. The drive sprocket 101 is mounted on the shaft 102 of the main drive motor 103, which is a hydraulic servomotor. The roller chain 100 extends through a path that includes a stationary rear idler sprocket 104 and a stationary front idler sprocket 107.

From the rear stationary idler sprocket 104, the chain extends to a driven sprocket 110 mounted on the vertical shaft 57 at the rearward end of the intermediate carriage 50. The sprocket 110 is relatively large to provide an advantageous drive reduction. In the embodiment shown, the driven sprocket 110 has 54 teeth.

From the driven sprocket 110, the chain 100 extends forward to a moving idler sprocket 112 mounted at the forward end of the intermediate carriage 50. From the sprocket 112, the chain 100 extends back to the front idler sprocket 107 on the main carriage 30.

Another length of roller chain 115, which will be called the "front control chain," engages an idler sprocket 116 mounted on the shaft 113 adjacent but independent from the moving idler sprocket 112, and is connected at one end to a connection 117 at the main carriage 30 and at its other end to a connection 118 on the head carriage 70.

Another length of roller chain 120, which will be termed the "rear control chain," passes around a rear control sprocket 121 mounted on the vertical shaft 57 and keyed to the driven sprocket 110. The sprocket 121 has 18 teeth or one-third as many as the sprocket 110. One end of the rear control chain 120 is connected at a connection 122 to the main carriage 30, and the other end is connected at a connection 123 to the head carriage 70.

Figure 4:
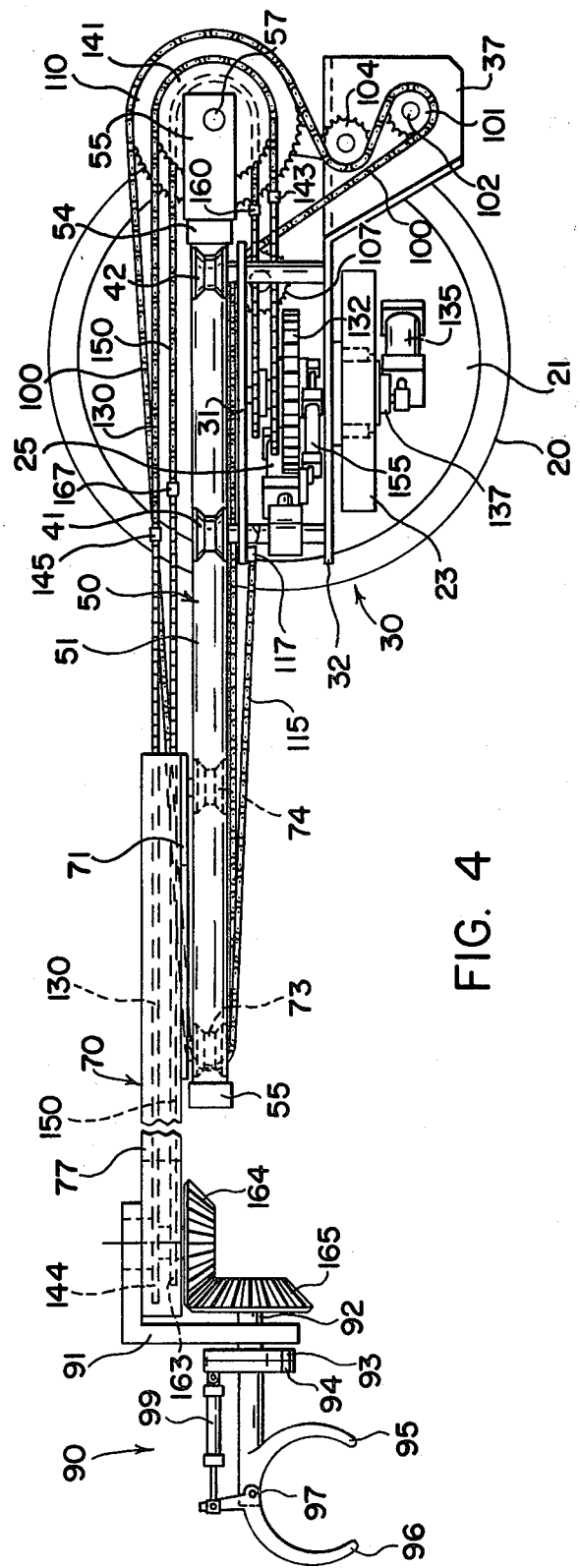
FIG. 4 is a plan view of the apparatus of FIGS. 2 and 3.
Figure 5:
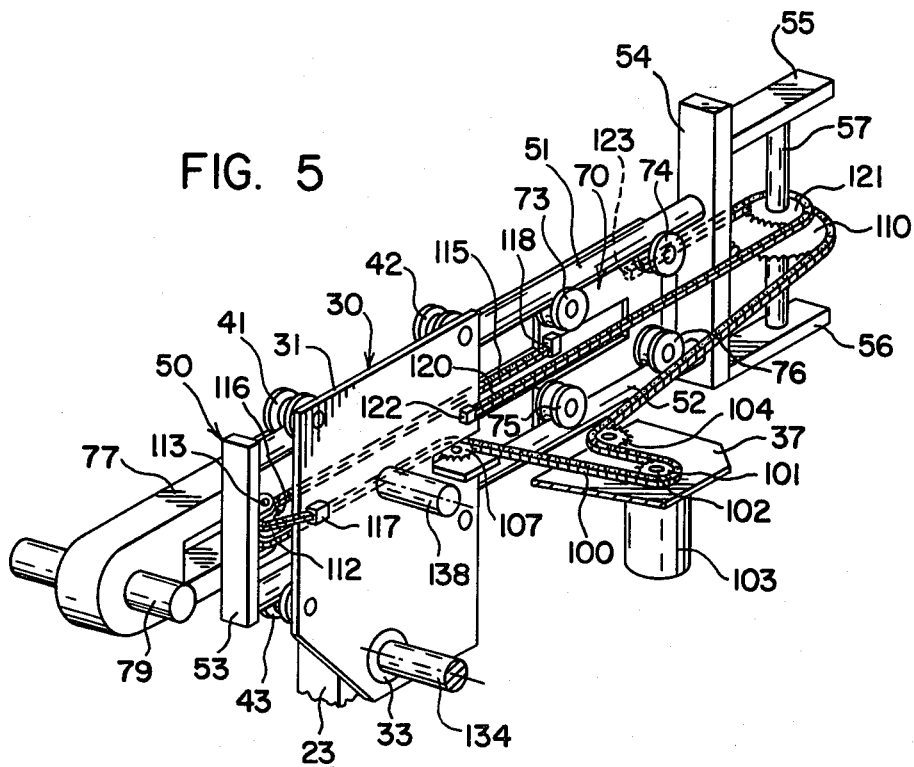
FIG. 5 is a schematic, perspective view illustrating the mechanism for controlling the telescoping extension and retraction of the intermediate carriage and head carriage of the arm assembly of the apparatus of the invention.
Figure 6:
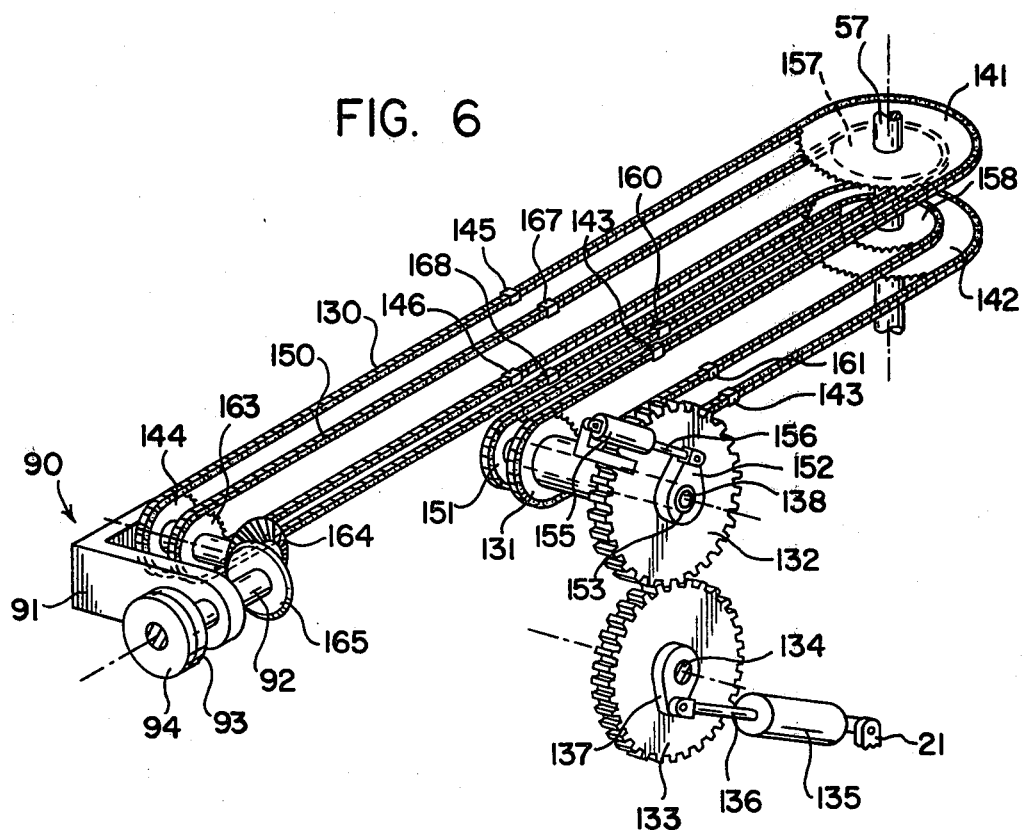
FIG. 6 is a schematic, perspective view illustrating the mechanisms for controlling the wrist tip and wrist roll functions of the apparatus of the invention.
Figure 7:
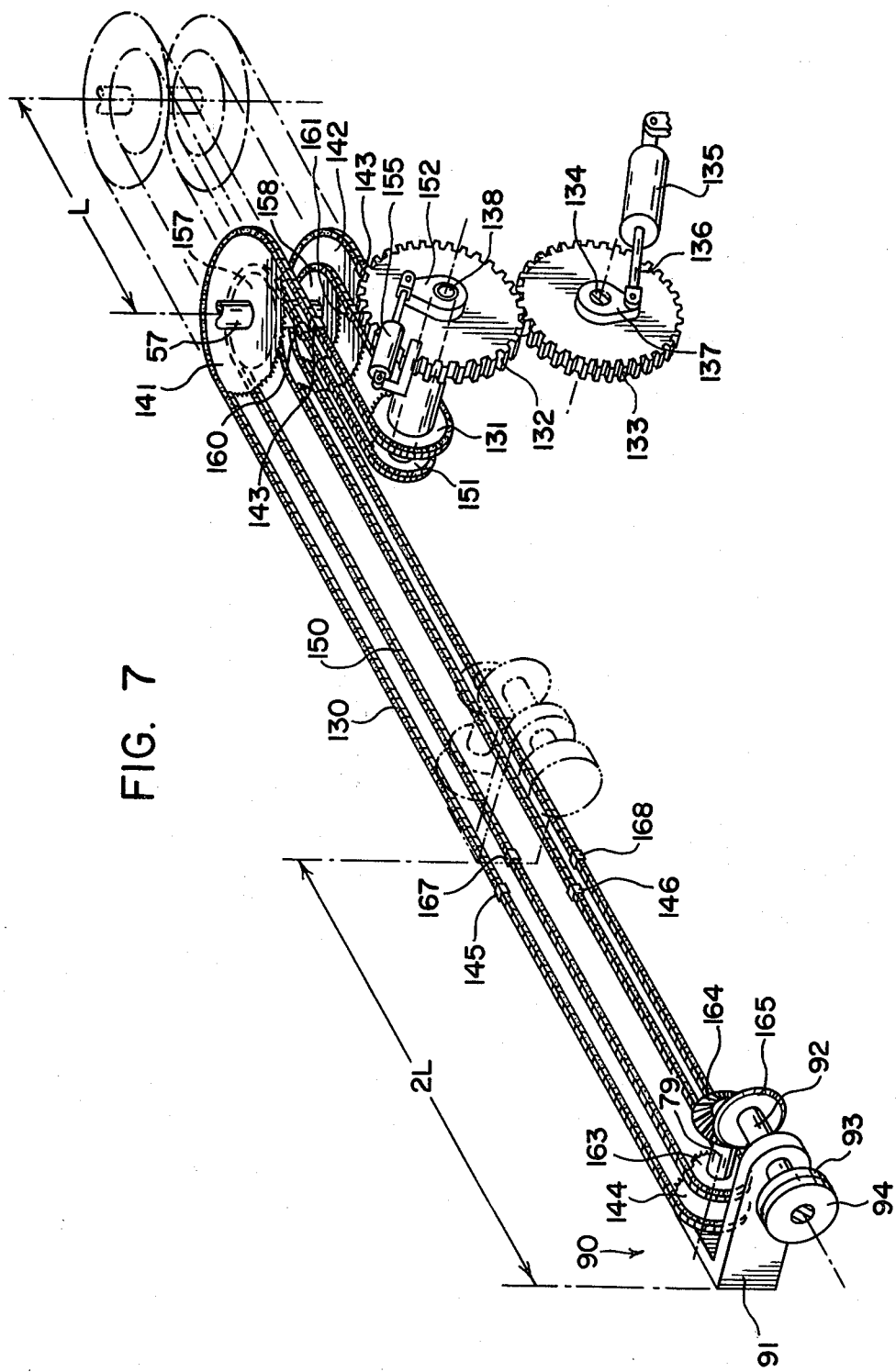
FIG. 7 is a schematic, perspective view illustrating the manner in which the remotely located main components of the mechanism for controlling the wrist tip and wrist roll movements of the apparatus of the invention accommodate the extension and retraction movements of the arm assembly.

Accordingly, the drive transmitted to the driven sprocket 110 turns the rear control sprocket 121, which, through the control chains 115 ad 120, turns the front control sprocket 116 to cause extension and retraction of the intermediate carriage relative to the main carriage 30 and at the same time causes simultaneous extension and/or retraction of the head carriage 70 relative to the intermediate carriage 50. It will be noted that the rate of travel of the head carriage will be twice that of the intermediate carriage in view of the mechanisms involved. This can be best understood with reference to FIG. 5. As the intermediate carriage 50 is extended from the position shown, the portion of the front control chain 115 between the connection 117 to the stationary main carriage 30, and the idler sprocket 116 increases. The idler sprocket 116 turns to feed the additional roller chain required in the lengthening portion. The portion of the front control chain 115 from the other side of the idler sprocket 116 to a corresponding position adjacent the connection 117 also increases in length at the same rate. However the latter length portion must not only lengthen, it must also feed (by flexing around the idler sprocket 116) the additional chain to lengthen the first described portion. Thus the latter roller chain portion must move at twice the speed of extension of the intermediate carriage 50 relative to the main carriage 30. As a result the head carriage 70 which is connected to the roller chain length 115 at the connection 118, is pulled forwardly at twice the speed of extension as the intermediate carriage 50. Thus, during extension, the carriages 50 and 70 move from a retracted position, illustrated in FIG. 5, through a path of travel that extends about twice the length of the intermediate carriage to the position illustrated in FIGS. 3 and 4. It will be noted that the drive motor 103 remains stationary, so that a minimum amount of the weight of the entire drive mechanism is carried at the outer end of the head carriage.

WRIST DRIVE SYSTEM

Figure 8:
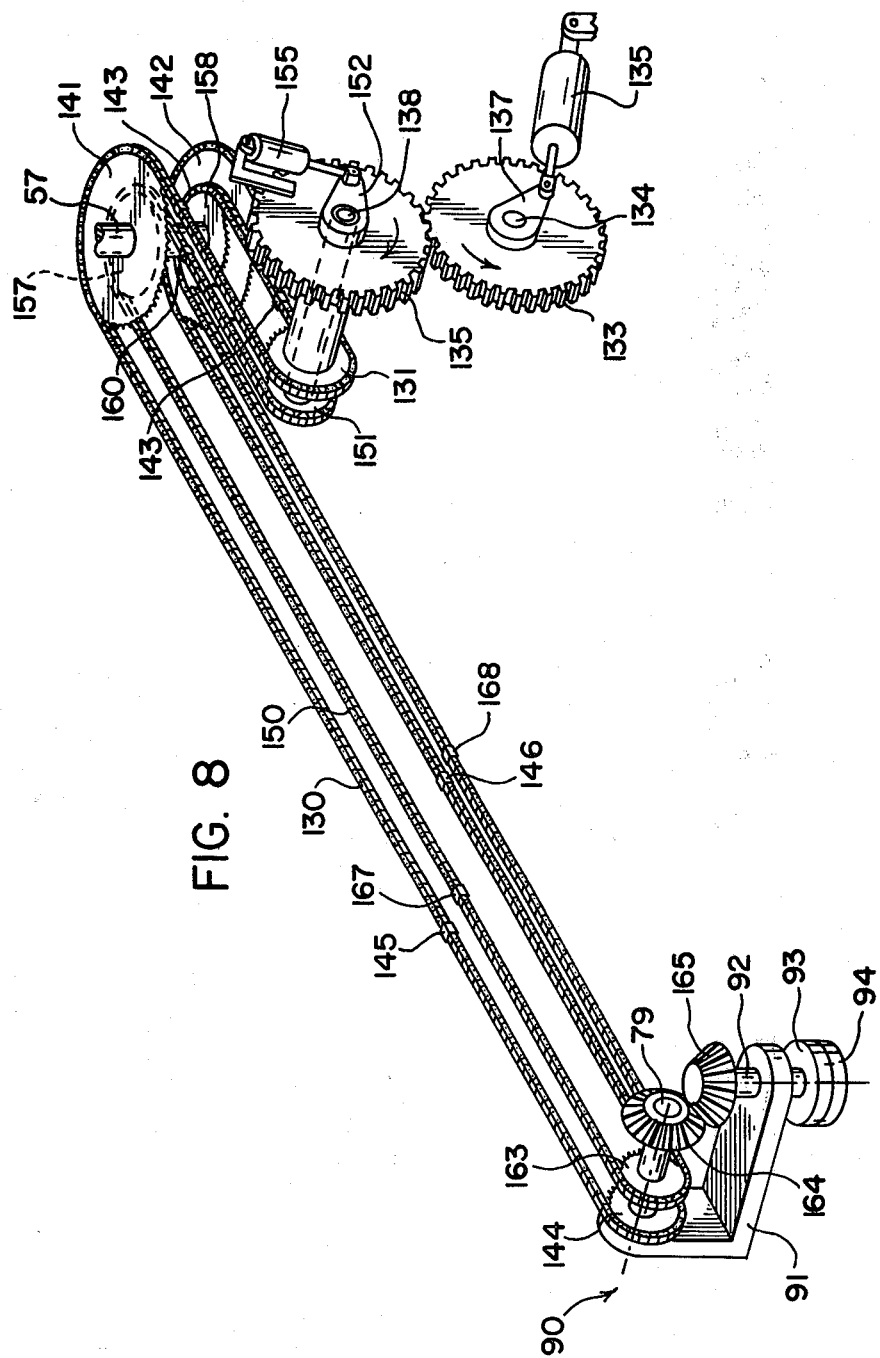
FIG. 8 is a schematic, perspective view, similar to FIGS. 5 and 6, illustrating the operation of the mechanism for controlling the wrist tip function when the wrist is tipped 90 degrees downward.
Figure 9:
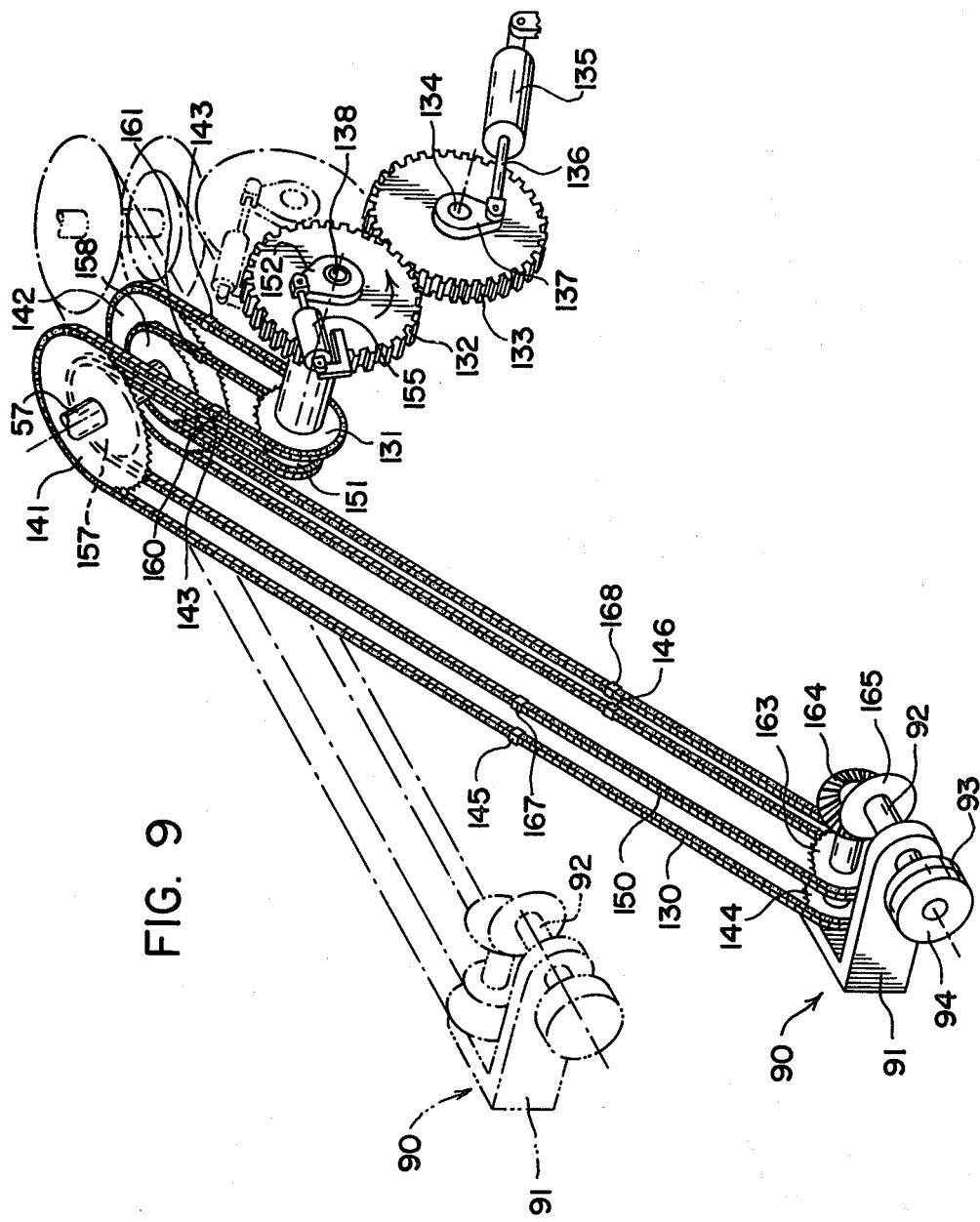
FIG. 9 is a schematic, perspective view showing the arm assembly tilted downward about the axis of tilt and the inherent ability of the mechanism for controlling the wrist tip motion to compensate for the tilting movement and maintain the wrist in a constant attitude.
Figure 10:
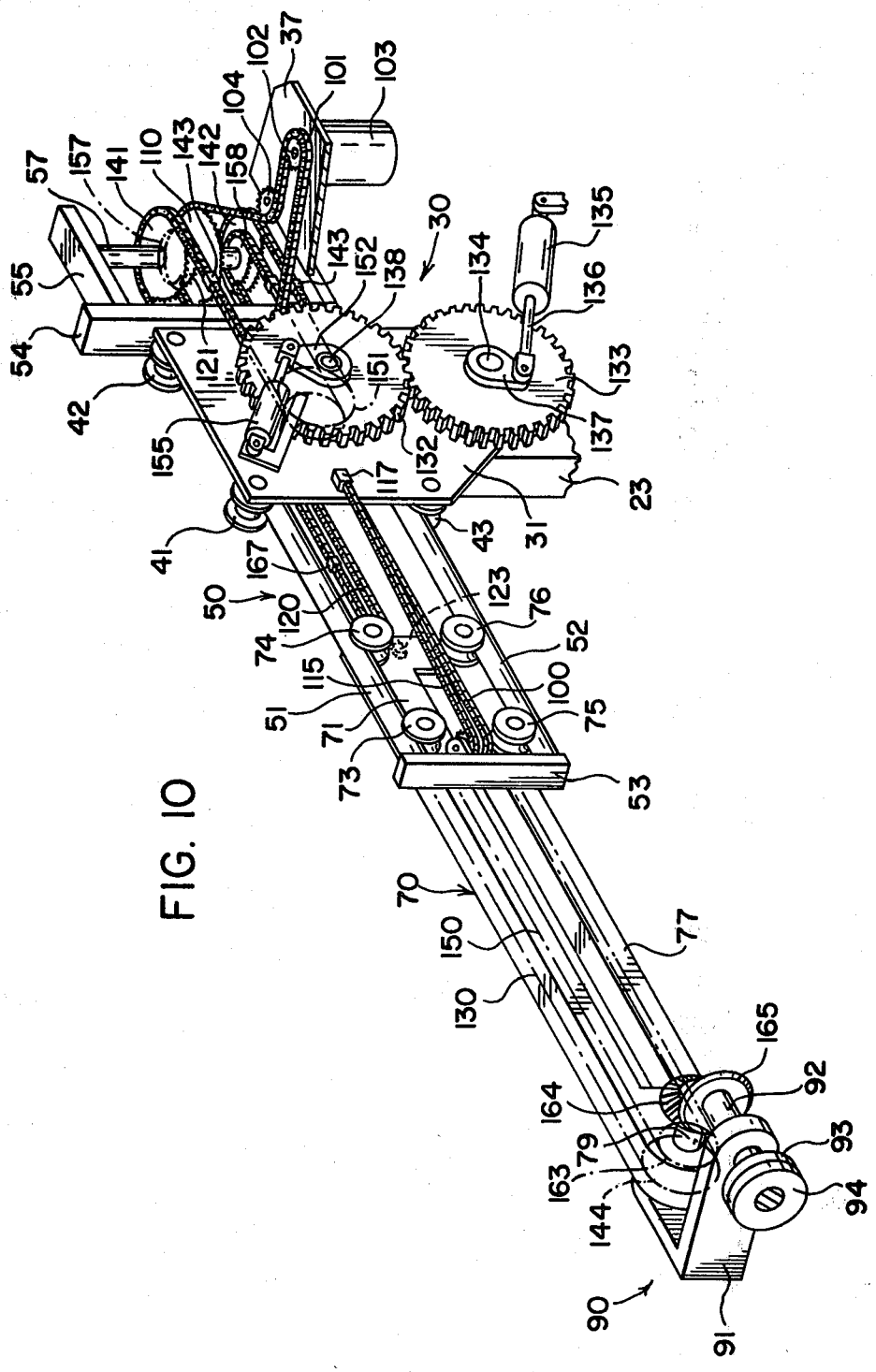
FIG. 10 is a schematic, perspective view illustrating the various mechanisms for extending and retracting the carriages of the arm assembly and for controlling the wrist movements of the apparatus of the invention.

The control of the wrist movements described above and for the wrist and hand assembly 90 is illustrated in FIGS. 6, 7, 8, and 9, and is accomplished by unique mechanisms that minimize the weight carried by the telescoping arm assembly, particularly at the forward end of the head carriage 70, and which provide a special feature by which the system maintains the operating head in the same attitude—normally a level attitude—relative to the wrist tip axis regardless of the position of the arm assembly about the tilt axis (FIG. 9).

The control of motion about the wrist tip axis is obtained by means of an endless wrist tip roller chain 130 that engages and is driven by and clamped to a wrist tip drive sprocket 131 mounted on the main carriage 30. The drive sprocket is keyed to a pinion 132 that meshes with another pinion 133 mounted on a pivot shaft 134 that is journaled in the hollow axles 33 and 34. Accordingly, movement of the pinion 133 turns the pinion 132, which in turn turns the wrist tip drive sprocket 131 (FIG. 8). The pinion 133 is operated by a servocylinder 135, with a piston rod 136 connected to a crank arm 137 secured to the pinion 133. The other end of the servocylinder 135 is anchored at a pivotal connection to the turret 21. Accordingly, the pinion 133 remains stationary relative to the turret 21 regardless of the position of tilt of the arm assembly about the tilt axis defined by the hollow shafts 33 and 34 unless the servocylinder 135 is operated to change the position. The drive sprocket 131 and pinion 132 are mounted on a shaft 138.

The chain 130 extends rearwardly from the sprocket 131 to engage a pair of vertical axis idler sprockets 141 and 142 mounted on the vertical shaft 57 at the rear of the intermediate carriage. Right angle joints are provided in the roller chain 130 between the sprocket 131 and the two idler sprockets 141 and 142 in order to permit the 90-degree change in direction of flexing of the chain. From the idler sprockets 141 and 142, the roller chain 130 extends forwardly to engage a driven sprocket 144 mounted on the wrist pin 79 and keyed to the wrist tip block 91. Here again, right angle joints are inserted in the roller chain 130 to accommodate the 90-degree change in direction of flexing about the sprocket 144. Accordingly, operation of the cylinder 135 turns the pinion 133, which turns the pinion 132, and thus the drive sprocket 131. The drive sprockets 131, in turn, turns the driven sprocket 144 to tip the wrist about the wrist pin axis as desired (FIG. 8).

The control of motion about the wrist roll axis defined by the wrist roll pin 92 is obtained by means of an endless wrist roll roller chain 150. The wrist roll chain 150 engages and is clamped to a roll drive sprocket 151 mounted coaxially with the wrist tip drive sprocket 131 on the shaft 138. The sprocket 151 is keyed to a sleeve 53 that extends through the sprocket 131 and pinion 132, and which has a lever arm 152 mounted on its opposite end. The sprocket 151 is adapted to move with the sprocket 131 through normal operation of the wrist tip drive system to assure that the attitude of the operating head remains fixed relative to the roll axis, as will be apparent to those skilled in the art. Accordingly, roll movement must be obtained by moving the roll drive sprocket 151 relative to the wrist tip drive sprocket 131. This is accomplished by means of a servocylinder 155, with its piston rod 156 connected to the lever arm 152 and with its other end pivotally connected to the pinion 132.

As with the wrist tip chain, the wrist roll chain extends rearwardly from the drive sprocket 151 to engage a pair of spaced, parallel idler sprockets 157 and 158 mounted between the idler sprockets 141 and 142 on the vertical shaft 57 at the rear of the intermediate carriage 50. Here again, a pair of right angle joints are provided in order to obtain the 90-degree reversal in direction of flexing of the chain. From the sprockets 157 and 158, the chain 150 extends forwardly to a driven sprocket 163 mounted for rotation on the wrist pin 79 and keyed to a bevel gear 164, also mounted on the wrist pin 79. The bevel gear 164 meshes with another bevel gear 165 mounted on and keyed to the roll shaft 92 so that the roll flange 93 is turned about the roll axis in response to rotation of the driven sprocket 163. Here again, a pair of right angle joints 167, 168 are provided to achieve the 90-degree change in direction of flexing that occurs between the idler sprockets 157 and 158 and the driven sprocket 163.

CONTROL SYSTEM

It will be apparent from the foregoing description that the apparatus A is capable of movement relative to five different axes. These are as follows:

(1) rotary movement of the turret about the vertical axis in a horizontal plane controlled by the rotary actuator 22;

(2) angular movement of the arm assembly in a vertical plane about a horizontal tilt axis defined by the trunnion 23, the drive being controlled by the servocylinder 25;

(3) linear extension and retraction of the intermediate carriage 50 and head carriage 70 in telescoping fashion relative to the main carriage 30 in response to operation of the rotary actuator 103;

(4) pivotal movement about a horizontal axis defined by the wrist pin 79 and controlled by the servocylinder 135;

(5) wrist rotation about the axis defined by the roll shaft 92 controlled by the servocylinder 155.

Figure 11:
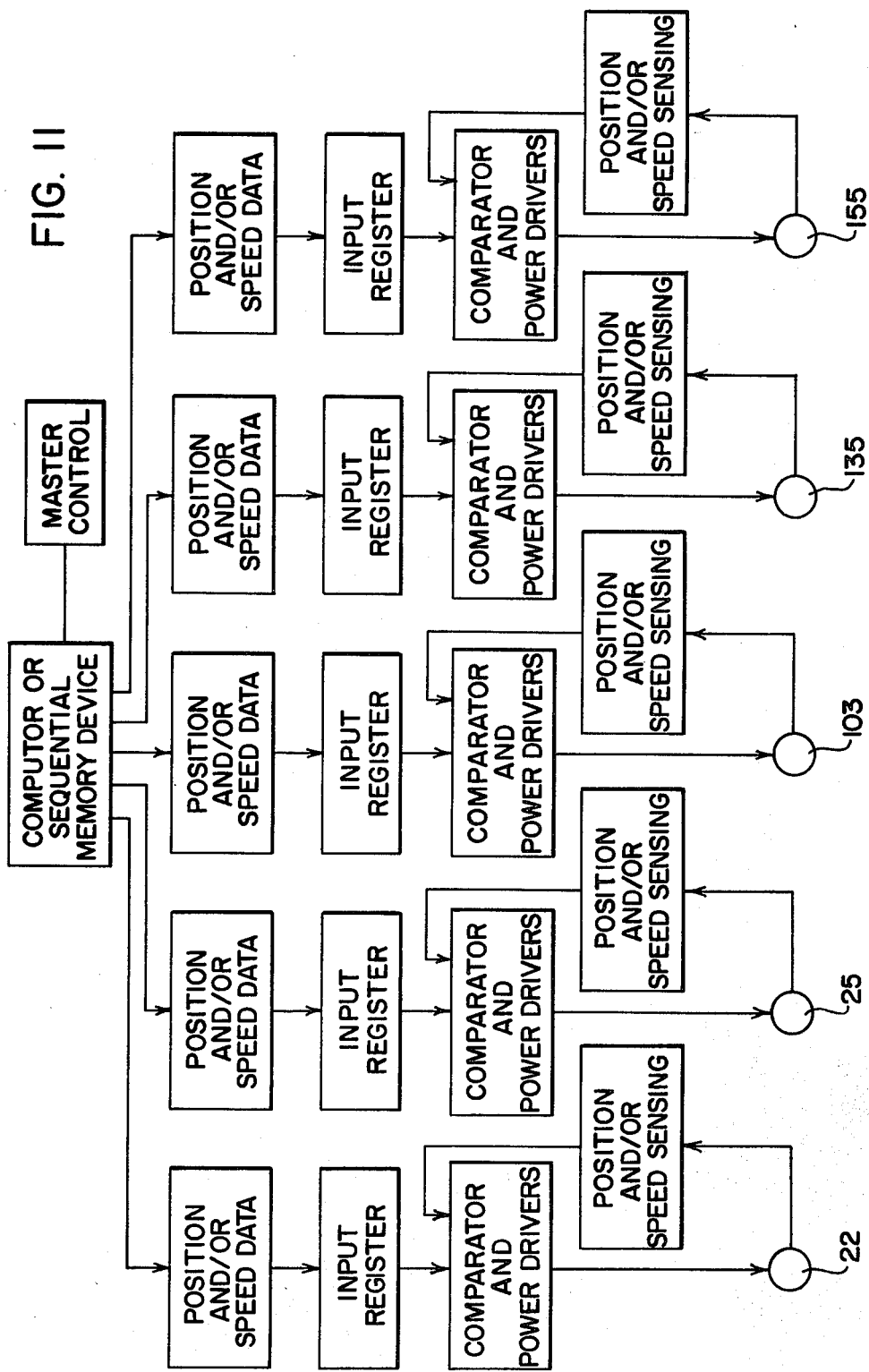
FIG. 11 is a schematic diagram illustrating the control system for movement of the apparatus embodying the invention relative to the various axes of motion to achieve the novel operating capabilities.

Accordingly, the basic movements are accomplished by means of five servomotors 22, 25, 103, 135, and 155, the control of which is achieved by a servodrive that would normally have a digital input from a computer or memory unit. Each of the servomechanisms may have a position and velocity sensor, each having a digital-to-analog converter to provide a signal output that is amplified and used to control the operation of the servoactuator to achieve the movement desired. The signal is transmitted to logic circuitry and then fed back into the control unit in the conventional manner, as will be readily apparent to those skilled in the art (FIG. 11).

It will be apparent from the foregoing description that the apparatus of the invention is capable of moving the operating head through a relatively large work envelope so as to not only be retractable to a relatively compact configuration that provides adequate clearance for opening and closing of the die platens, but which also permits adequate extension into the dies for grasping and extracting the casting, removing the casting from the operating space between the die platens, and subsequently moving the casting to and through a number of processing stations as desired.

Figure 3:
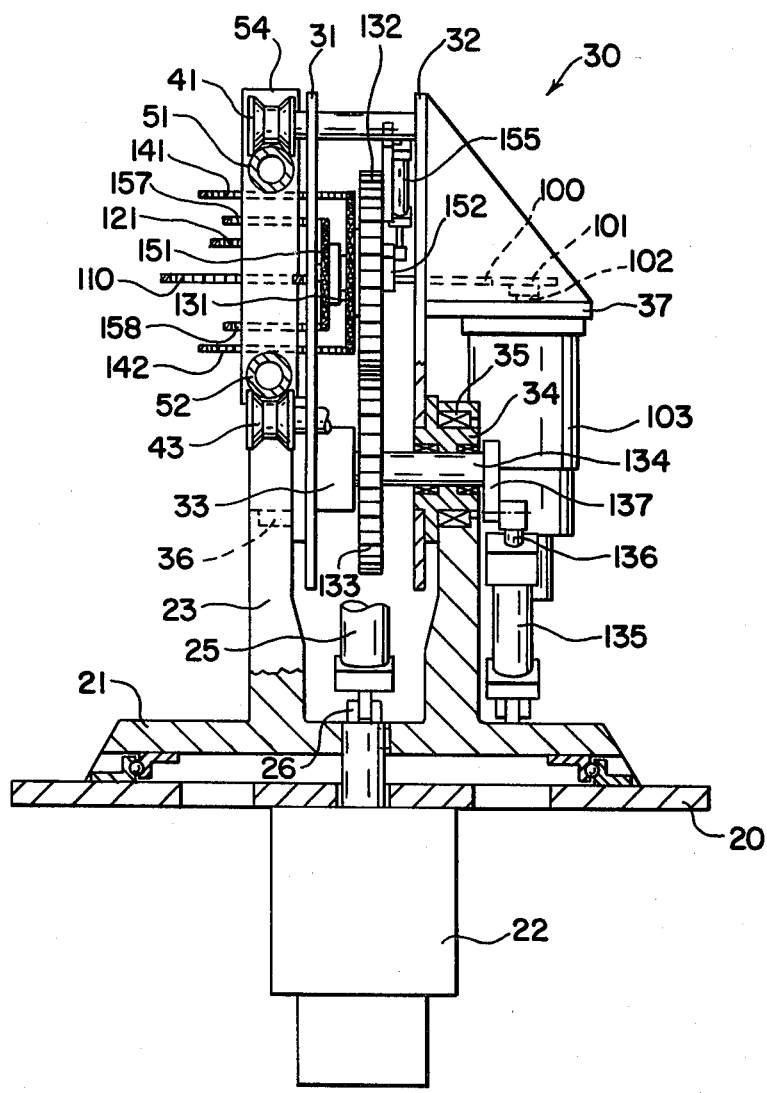
FIG. 3 is a sectional view, taken on the line 3—3 of FIG. 2.

It is particularly significant that most of the weight of the drive components to achieve the various movements is located rearwardly of the arm assembly over the trunnion and turret so as to both minimize the weight carried at the end of the head carriage and maximize the load carrying potential of the mechanism. Also, the unique arrangement for the drive to achieve the wrist tipping function enables the wrist assembly to mechanically maintain the operating head in a constant attitude during tilting movement of the arm assembly about the axis defined by the trunnion. This feature is best illustrated in FIG. 9 wherein it will be seen that the tilting movement of the arm assembly about the tilt axis defined by the hollow axles 33 and 34 (which turn in the journal bearings 35 and 36 as shown in FIG. 3), carries the pinion 132 (and the sprocket 131) in an arc about and in mesh with the pinion 134 (which remains fixed relative to the trunnion 23). The resulting turning of the pinion 132 and sprocket 131 causes turning of the sprocket 144 through the roller chain 130, and the sprockets 131 and 144 having the same diameter, this keeps the operating head 90 in the same attitude (see initial position in dashed lines in FIG. 9) relative to the trunnion 23 as illustrated in solid lines in FIG. 9. This advantage resides not only in the mechanical aspects but also reduces the complexity of the control system.

Another advantage of the mechanism of the invention resides in the capability for conveniently feeding flexible lines to the operating head. In most telescoping devices, it is difficult to run flexible lines such as hoses for liquid and/or air, multi-conductor electrical lines for sensors, motor driven welders, etc., linear or rotary flexible cable drivers, etc. to the operating head. With the mechanisms of the invention, such lines may run from a fixed location or manifold on the main carriage to an idler reel or pulley mounted at the rearward end of the intermediate carriage 50 and with their axes parallel to the axis of the shaft 57, and then forwardly to the forward end of the head carriage 70.

With this arrangement, the lines are fed from the reel or carriage at a rate that coincides with the speed of extension or retraction of the operating head without any need for loose loops, spring-loaded take-up reels, or the like.

While the invention has been shown and described with respect to a specific embodiment thereof, this is intended for the purpose of illustration rather than limitation, and other variations and modifications of the specific device herein shown and described will be apparent to those skilled in the art, all within the intended spirit and scope of the invention. Accordingly, the patent is not to be limited in scope and effect to the specific device herein shown and described, nor in any other way that is inconsistent with the extent to which the progress in the art has been advanced by the invention.

What is claimed is:

1. In apparatus for moving through coordinated functions, an operating head mounted on and extendable linearly relative to a base, the improvement comprising:
a main carriage mounted on said base for pivotal movement about a tilt axis,
an intermediate carriage mounted on said main carriage for travel relative thereto between an extended position and a retracted position,
a head carriage mounted on said intermediate carriage for travel relative thereto between an extended position and a retracted position in telescoping fashion relative to said main carriage, said operating head being connected to said head carriage for pivotal movement about a wrist tip axis parallel to said tilt axis,
drive means operatively connected between said main carriage and said intermediate carriage for moving said intermediate carriage between said extended and retracted positions,
first control wheel means mounted for rotation at the forward end of said intermediate carriage,
second control wheel means mounted for rotation at the rearward end of said intermediate carriage,
a first length of flexible connecting means connected at one end to said main carriage and extending forwardly to and in operative engagement with said first control wheel means, and thence rearwardly to a connection to said head carriage,
a second length of flexible connecting means connected at one end to said main carriage and extending rearwardly to and in operative engagement with said second control wheel means and thence forwardly to a connection to said head carriage whereby when said drive means extends and retracts said intermediate carriage relative to said main carriage, said lengths cause simultaneous extension and retraction respectively of said head carriage relative to said intermediate carriage,
a pivotal tip control means operatively connected to said operating head and mounted on said head carriage for pivotal movement about said wrist tip axis,
a pivotal wrist tip drive means mounted on said main carriage and having an axis parallel to said wrist tip axis,
idler wheel means mounted at the rearward end of said intermediate carriage for free rotation about an axis angularly disposed relative to said wrist tip axis in a plane parallel to said wrist tip axis, and
an endless, flexible, inextensible connecting means operatively connecting said tip control means, said idler wheel means and said tip drive means whereby said wrist tip drive means remains operatively connected to said tip control means during telescoping extension and retraction movement of said head carriage and intermediate carriage relative to said main carriage.

2. Apparatus as defined in claim 1, wherein said drive means comprises fluid cylinder means.

3. Apparatus as defined in claim 1, wherein said drive means comprises:
a driven wheel mounted on said intermediate carriage coaxial with and keyed to said second control wheel means;
an idler wheel mounted on said intermediate carriage at the forward end thereof;
a drive wheel mounted on said main carriage and rotary drive means therefor; and
endless flexible connecting means operatively connected to said driven wheel, said idler wheel, and said drive wheel whereby when said drive means turns said drive wheel in one direction, said intermediate carriage and said head carriage are extended in telescoping fashion and when said drive means turns said drive wheel in the opposite direction said intermediate carriage and said head carriage are retracted in telescoping fashion.

4. Apparatus as defined in claim 1, wherein said first and second control wheel means comprise sprockets and wherein said first and second lengths of flexible connecting means comprise roller chain lengths engaging their respective sprockets.

5. Apparatus as defined in either of claims 3 wherein said driven wheel, said idler wheel and said drive wheel comprise sprockets and wherein said endless flexible inextensible connecting means comprises a roller chain operatively engaging and connecting said sprockets.

6. Apparatus as defined in claim 1, wherein said drive means for said wrist tip drive means is operatively connected between said wrist tip drive means wheel and said base whereby said operating head will be supported in a fixed attitude about said wrist tip axis relative to said base during tilting movement of said main carriage on said pedestal.

7. Apparatus as defined in any of claims 1 or 6, wherein said tip control means, said pair of idler wheel means, and said tip drive means comprise sprockets and wherein said first endless flexible inextensible connecting means comprises an endless roller chain means operatively engaging said sprockets.

8. Apparatus as defined in claim 1, wherein said operating head is connected to said head carriage for pivotal roll movement about a wrist roll axis perpendicular to said wrist tip axis and further comprising means for controlling the pivotal roll movement of said operating head relative to said head carriage and including drive means located on said main carriage.

9. Apparatus as defined in claim 8 wherein said means for controlling the pivotal roll movement of said operating head about said wrist roll axis comprises a pivotal roll control means operatively connected to said operating head and mounted for pivotal movement about said wrist tip axis, idler wheel means mounted at the rearward end of said intermediate carriage, a pivotal wrist roll drive means mounted on said main carriage and having an axis parallel to said wrist tip axis, drive means for turning said wrist roll drive means and an endless flexible connecting means operatively connecting said roll control means, said idler wheel means, and said roll drive means whereby said roll drive means remains operatively connected to said roll control means during telescoping extension and retraction movement of said head carriage and intermediate carriage relative to said main carriage.

10. Apparatus as defined in claim 9, wherein said roll control means, said idler wheel means, and said roll drive means comprise sprockets and wherein said second endless flexible connecting means comprises and endless roller chain means operatively engaging said sprockets.

11. In apparatus for moving through coordinated functions, an operating head mounted at a wrist assembly to an arm assembly that is mounted on and extendable linearly in telescoping fashion relative to a base and pivotable thereon about a tilt axis, the operating head being pivotable about a wrist tip axis perpendicular to the direction of linear movement of said arm assembly and parallel to said tilt axis, the improvement comprising:

an arm assembly main carriage mounted on said base, an arm assembly intermediate carriage mounted on said main carriage for travel relative thereto between an extended position and a retracted position, an arm assembly head carriage mounted on said intermediate carriage for travel relative thereto between an extended position and a retracted position in telescoping fashion relative to said main carriage, drive means operatively connected between said main carriage and said intermediate carriage for moving said intermediate carriage between said extended and retracted positions, means operatively connected to said main carriage, said intermediate carriage and said head carriage for extending and retracting said head carriage relative to said intermediate carriage in response to respective extension and retraction of said intermediate carriage relative to said base, a pivotal tip control means operatively connected to said operating head and mounted on said head carriage for pivotal movement about said wrist tip axis, idler wheel means mounted at the rearward end of said intermediate carriage, a pivotal wrist tip drive means mounted in a fixed position relative to said base and having an axis parallel to said wrist tip axis, means for turning said wrist tip drive means, said turning means being operatively connected between said wrist tip drive means and said base, whereby said operating head will be supported in a fixed attitude about said wrist tip axis relative to said base during tilting movement of said arm assembly on said base, and an endless, flexible, inextensible connecting means operatively connecting said tip control means, said idler wheel means, and said wrist tip drive means whereby said wrist tip drive means remains operatively connected to said wrist tip control means during extension and retraction movement of said arm assembly.

12. Apparatus as defined in claim 11, wherein said tip control means, said idler wheel means, and said tip drive means comprise sprockets and wherein said first endless flexible, inextensible connecting means comprises an endless roller chain means operatively engaging said sprockets.

13. Apparatus as defined in claim 11, wherein said operating head is connected to said arm assembly or pivotal roll movement about a wrist roll axis perpendicular to said wrist tip axis and further comprising means for controlling the pivotal roll movement of said operating head relative to said arm assembly.

14. Apparatus as defined in claim 13, wherein said means for controlling the pivotal roll movement of said operating head about said wrist roll axis comprises a roll control means operatively connected to said operating head and mounted on said arm assembly for rotation about said wrist tip axis, a pair of parallel wheel means mounted in axially spced relation at the rearward end of said arm for free rotation about an axis perpendicular to said wrist tip axis, a wrist roll drive means mounted in fixed position relative to said arm and having an axis parallel to said wrist tip axis, drive means for turning said wrist roll drive means and an endless flexible connecting means operatively connecting said roll control means, said pair of idler means, and said roll drive wheel means whereby said roll drive means remains operatively connected to said roll control means during movement of said arm.

15. Apparatus as defined in claim 14, wherein said roll control means, said idler wheel means, and said roll drive means comprise sprockets and wherein said second endless flexible connecting means comprises an endless roller chain means operatively engaging said sprockets.

16. In apparatus for moving through coordinated functions an operating head mounted on and extendable linearly relative to a base, the improvement comprising;

a main carriage mounted on said base;

an intermediate carriage mounted on said main carriage for travel relative thereto between an extended position and a retracted position;

a head carriage mounted on said intermediate carriage for travel relative thereto between an extended position and a retracted position in telescoping fashion relative to said main carriage;

a driven wheel mounted on said intermediate carriage at the rearward end thereof;

an idler wheel mounted on said intermediate carriage at the forward end thereof;

a drive wheel mounted on said main carriage and rotary drive means therefor;

endless flexible connecting means operatively connected to said drive wheel, said idler wheel, and said driven wheel whereby when said drive means turns said drive wheel in one direction, said intermediate carriage is extended relative to said main carriage and when said drive means turns said drive wheel in the opposite direction said intermediate carriage retracted relative to said main carriage;

first control wheel means mounted for rotation at the forward end of said intermediate carriage;

second control wheel means mounted for rotation at the rearward end of said intermediate carriage coaxial with and keyed to said driven wheel;

a first length of flexible connecting means connected at one end to said main carriage and extending forwardly to and in operative engagement with said first control wheel means, and thence rearwardly to a connection to said head carriage; and a second length of flexible connecting means connected at one end to said main carriage and extending rearwardly to and in operative engagement with said second control wheel means, and thence forwardly to a connection to said head carriage whereby when said intermediate carriage extends and retracts relative to said main carriage, said lengths cause simultaneous extension and retraction respectively of said head carriage relative to said intermediate carriage.

17. Apparatus as defined in claim 16, wherein said first and second control wheel means comprise sprockets and wherein said first and second lengths of flexible connecting means comprise roller chain lengths engaging their respective sprockets.

18. Apparatus as defined in either of claims 16 or 17 wherein said driven wheel, said idler wheel and said drive wheel comprise sprockets and wherein said endless flexible connecting means comprises a roller chain operatively engaging and connecting said sprockets.

* * * * *